(12) United States Patent
Nelson (10) Patent No.: US 6,882,654 B1
(45) Date of Patent: Apr. 19, 2005

(54) PACKET DATA ANALYSIS WITH EFFICIENT BUFFERING SCHEME

(75) Inventor: William M. Nelson, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 912 days.

(21) Appl. No.: 09/714,673

(22) Filed: Nov. 14, 2000

(51) Int. Cl.⁷ .............................. H04L 12/28; H04J 3/24
(52) U.S. Cl. ...................... 370/401; 370/392; 370/417; 370/474; 710/52
(58) Field of Search ................................ 370/352, 392, 370/389, 417, 412, 469, 401, 429; 710/52; 709/203

(56) References Cited

U.S. PATENT DOCUMENTS 5,278,834 A * 1/1994 Mazzola ................... 370/94.1
5,787,253 A * 7/1998 McCreery et al. ...... 395/200.61
6,757,727 B1 * 6/2004 Ivory ......................... 709/224

* cited by examiner

Primary Examiner—Duc Ho
(74) Attorney, Agent, or Firm—Beyer, Weaver & Thomas, LLP.

(57) ABSTRACT

Disclosed is an apparatus employing an efficient buffering scheme for analyzing the Layer 7 content in packet data sent from a first node to a second node within a computer network. The apparatus includes a first device having a buffer and one or more first processors. The apparatus also includes a second device having one or more second processors. The first device is a physically separate device from the second device. The second processor of the second device is configured to manage the buffer of the first device, and the first processor is also configured to analyze packet data accessed from the buffer.

31 Claims, 4 Drawing Sheets

PACKET DATA ANALYSIS WITH EFFICIENT BUFFERING SCHEME

BACKGROUND OF THE INVENTION

The present invention relates to methods and apparatus for analyzing packet data transmitted and received within a network. More specifically, this invention pertains to buffering packet data while packet analysis is being performed or until analysis begins.

In a specific application, packet data is received into a Layer 7 Switch that "sits" in front of a plurality of routers. Layer 7 corresponds to the Open System Interconnect (OSI) "Application Layer." The Layer 7 Switch may be configured to perform a number of packet analysis procedures on received packet data. By way of specific implementation, IP fragments are stored until all fragments of an IP packet are received. A Session Identifier and a Virtual Server Identifier (VSID) are then determined for packet data received into the switch. For instance, the Session ID is based on the packet data's protocol type, source and destination IP addresses, and source and destination ports. In order to analyze the Layer 7 data, received packet data is also rearranged into its proper order and any duplicates and errors are removed. The Layer 7 Switch also searches through a database or table for one or more data fields within the received packet data. The search result indicates, for example, a set of servers that are configured to receive and handle such packet data. The search result may then be used to determine to which specific server the packet data is to be routed (e.g., by using a conventional load balancing technique). For instance, HTTP requests for textual data may be routed to a first group of servers and multimedia to a second group. A conventional load balancing algorithm (e.g., round robin) is then used to select a server within the particular group. Prior to transmitting the packet data to the selected server, a network address translation (NAT) operation is typically performed on the packet data's destination address to change it to the selected server's address. The packet data is then transmitted out of the Layer 7 Switch to the selected server.

Buffering may be required for a number of the above described packet analysis procedures. The packet fragments (e.g., of a packet datagram) received into the switch may have to be stored until all of the fragments are received so that the fragments may be reassembled into the data that was originally sent (e.g., into a datagram sent by the client). Also, packet frames may also have to be buffered so as to re-order any out-of-order frames. Packet data may also be stored until searching mechanisms are available to process the packet data. Finally, packet data may be stored until a switching decision has been made and then possibly until the final destination has acknowledged such packet data.

Conventionally, the above described packet analysis mechanisms are implemented within a centralized system, such as by a configured general purpose processor. In a centralized system, data is buffered for each analysis mechanism. Such a centralized packet analysis scheme typically provides low performance and is also difficult to scale. For example, a centralized packet analyzer may only perform one analysis task at a time. That is, a first task must be completed before a second task is started.

In sum, given the increase of traffic on the Internet and World Wide Web and the growing bandwidth demands of ever more sophisticated multimedia content, there has been constant pressure to find more efficient ways to analyze and buffer packet data.

SUMMARY OF THE INVENTION

Accordingly, the present invention provides apparatus and methods for buffering packets within a system that distributes different tasks (e.g., packet reordering, datagram reassembly, and Layer 7 packet analysis) into different modules. Such a distributed system may result in increased performance. In general terms, the present invention represents an improvement over conventional packet buffering mechanisms in distributed Layer 7 switches by providing a centralized buffer and centralized buffer manager for a plurality of distributed packet data analysis procedures. In one implementation, a TCP module is configured to perform buffer management. That is, the TCP module knows which addresses within the buffer are free and which are allocated. The TCP module also includes at least one data structure that holds a plurality of references to the buffer's addresses. In this implementation, a Layer 7 Module does the buffering. The TCP Module instructs the Layer 7 Module through one or more commands to perform various buffering procedures, such as wiring data to the buffer and reading data from the buffer.

In one embodiment, an apparatus for buffering packet data sent from a first node to a second node within a computer network is disclosed. The apparatus includes a first device having a buffer and one or more first processors. The apparatus also includes a second device having one or more second processors. The first device is a physically separate device from the second device. The second processor of the second device is configured to manage the buffer of the first device, and the first processor is also configured to analyze packet data accessed from the buffer.

In a preferred embodiment, the second processor of the second device is further configured to analyze portions of the packet data accessed from the buffer of the first device. In a specific implementation, the second processor of the second device manages the buffer of the first device by causing packet data to be stored in the buffer until the first processor is ready to analyze such packet data. In another aspect, the second processor of the second device manages the buffer of the first device by causing packet data to be read from the buffer when the first processor is ready to analyze such packet data. In yet another aspect, the second processor of the second device manages the buffer of the first device by causing packet data to be stored in the buffer until a decision has been reached as to such packet data's destination. In another embodiment, the second processor of the second device manages the buffer of the first device by causing packet data to be read from the buffer and transmitted to the destination when a decision has been reached as to such packet data's destination.

In an alternative embodiment, the apparatus includes a buffer module associated with a buffer. The buffer module includes a receive module for receiving packet data and writing it to the buffer and a transmit module for transmitting packet data from the buffer. The apparatus further includes a manager module for receiving packet data. The manager is configured to send commands to the buffer module indicating that received packet data is to be stored within the buffer at locations specified by the manager module and specifying data portions that are to be transmitted from the buffer to a selected destination.

In a preferred implementation, the buffer module further includes an analyze module for analyzing packet data read from the buffer, and one or more of the commands sent by the manager to the buffer module specify which packet data from the buffer is to be read from the buffer and analyzed by the analyze module. In a specific embodiment, the commands sent by the manager to the buffer module include a receive command for instructing the receive module of the buffer module to write specific packet data to the buffer, a transmit command for instructing the transmit module of the buffer module to transmit specific packet data, and an analyze command for instructing the analyze module of the buffer module to analyze specific packet data.

In yet another embodiment, the apparatus includes a first means for receiving packet data and sending at least a receive command indicating a buffer location for writing the received packet data within a buffer and a second means for receiving the receive command and received packet data and writing the packet data to the buffer based at least on the receive command. The first means is also configured for sending at least a transmit command indicating that a specified data portion is to be transmitted from the buffer; and the second means is also configured for receiving the transmit command and in response to such transmit command, transmitting the specified data portion from the buffer.

In another aspect, the invention pertains to a method of analyzing packet data sent from a first node to a second node within a computer network. In a first module, packet data is received and a receive command indicating a buffer location for writing the received packet data within a buffer associated with a second module is sent. In the second module, the receive command and received packet data are received and the packet data is written to the buffer based at least on the receive command. In the first module, a transmit command indicating that a specified data portion is to be transmitted from the buffer is sent. In the second module, the transmit command is received and in response to such transmit command, the specified data portion is transmitted from the buffer. In yet a further embodiment, the invention pertains to a computer program product for analyzing packet data sent from a first node to a second node within a computer network. The computer program product has at least one computer readable medium and computer program instructions stored within at least one of the computer readable product configured to cause a processing device to perform the above described method operations.

Several embodiments of a centralized buffer configuration may provide relatively low overhead costs in terms of buffer management, allocation, and deallocation, read/write complexities and cycle time usage (e.g., low memory bandwidth usage), as compared to a distributed buffer scheme. In a distributed buffer scheme, one buffer may become full, while another buffer has a relatively large amount of free space. In such a case, the module with excess free buffer space may consume resources processing data, only to have the results of this processing be discarded due to lack of space in another buffer. Furthermore, when buffering is performed in multiple modules, each module must perform similar buffer management and data buffering operations. This duplication of similar functions represents greater expenditure of resources to perform the same data analysis task.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The buffering mechanisms described further below may be implemented for any suitable applications. In one embodiment, buffering may be performed for a web caching application. That is, packet data is buffered prior to determining to which cache device it is to be forwarded. In another application illustrated below, buffering is used within a load balancing application. In one specific implementation, buffering mechanisms are implemented with a Layer 7 Load Balance Switch.

Figure 1:
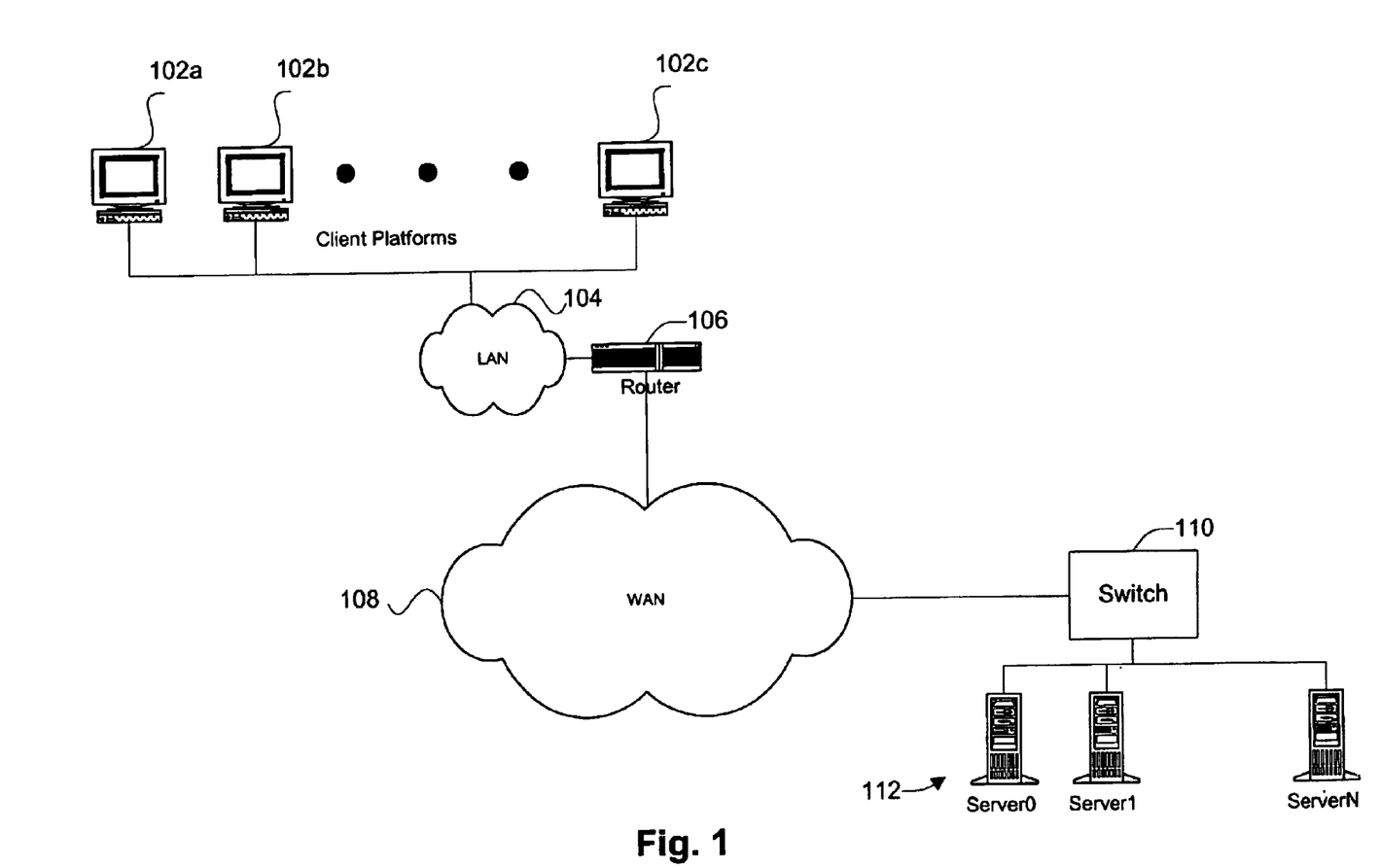
FIG. 1 is a network diagram illustrating a Layer 7 Switch according to a specific embodiment of the present invention.

FIG. 1 is a simplified network diagram which will be used to describe a specific embodiment of the present invention as applied within a Layer 7 Load Balancing Switch. Of course, although the present invention is described in terms of a specific load balancing application, this is not meant to limit the scope of the invention to this specific application. According to this specific implementation, a plurality of client machines 102 which are resident on a local area network (LAN) 104 communicate via router 106 and wide area network (WAN) 108, e.g., the internet, with a destination site 112. Of course, some or all of the clients 102 may communicate with the router 106 through various other configurations, rather than through a LAN. For example, a client may be coupled directly to the router 106 or there may be one or more intermediate routers between a client 102 and the router 106.

Generally speaking, when a client platform (e.g., 102a) communicates with some remote server (e.g., 112), whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection. Of course, any other suitable communication protocol may be utilized, besides or in addition to TCP.

As shown in FIG. 1, a switch 110 is also interposed between the clients 102 and the destination site 112. In one embodiment, the switch may include one or more distribution mechanisms for handling packet data arriving into the switch 110 that is destined for site 112. The distribution mechanisms generally determine to which server of destination site 112 to send the received packet data. The switch 110 also handles packet data from one of the servers 112 (e.g., Server0) to a client (e.g. client 102a).

Figure 2:
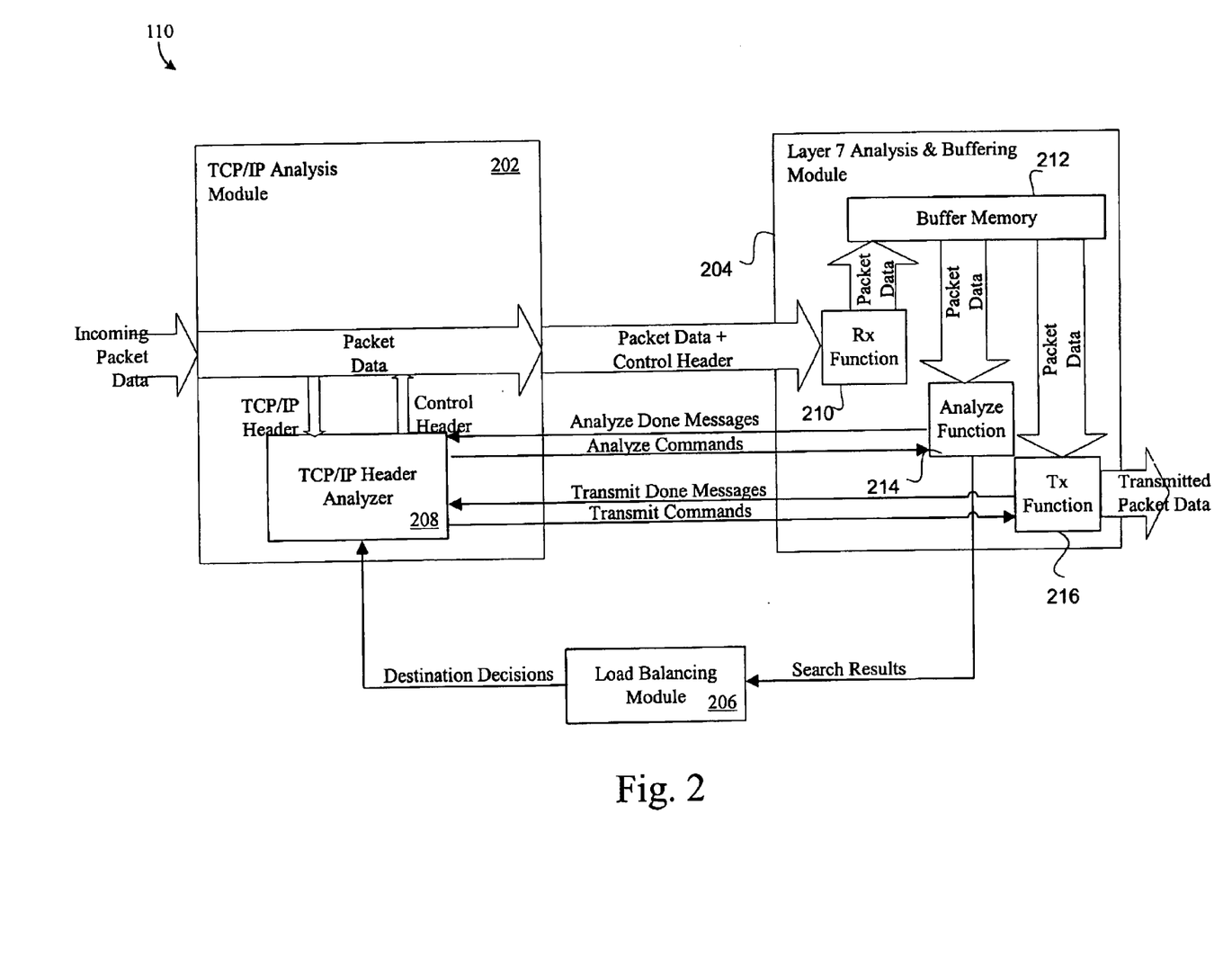
FIG. 2 is a diagrammatic representation of the switch of FIG. 1 in accordance with one embodiment of the present invention.

FIG. 2 is a diagrammatic representation of the switch 110 of FIG. 1 in accordance with one embodiment of the present invention. As shown, the switch 110 includes a TCP/IP Analysis Module 202, a Layer 7 Analysis Buffering Module 204, and a Load Balancing Module 206. Incoming packet data is received by TCP/IP Analysis Module 202 and forwarded to Layer 7 Analysis and Buffering Module 204. Transmitted packet data is output from the Layer 7 Module 204. For example, incoming packet data may originate from a client 102 via the wide area network (WAN) 108 or originate from a server 112 of FIG. 1. Likewise, the transmitted packet data may be output to one of the servers 112 or a client 102 via WAN 108 of FIG. 1.

The TCP Module is generally configured to determine which TCP session any particular data packet belongs and present ordered and error-free packet data to Layer 7 Module 204. The TCP Module 202 analyzes the TCP header to accomplish these two tasks. The TCP Module 202 also sends one or more control signals to the Layer 7 Module to specify a particular parsing procedure be performed on the packet data. The Layer 7 Module is generally configured to parse through the Layer 7 packet data and performs searches on such parsed data. The Layer 7 Module may also output search results to the Load Balancing Module 206. The Load Balancing Module determines a destination for the packet data based on the search results. This destination decision is communicated to the TCP Module 202, which then instructs the Layer 7 Module to transmit the packet data to the destination indicated by the Load Balancing Module 206. Of course, the Load Balancing Module 206 itself may directly communicate and instruct the Layer 7 Module on how to transmit the packet data or the Layer 7 Module 204 may determine how to transmit the packet data based on its own search results.

Although each module (i.e., TCP Module, Layer 7 Module, and Load Balancing Module) has buffering requirements so as to perform various packet analysis procedures (e.g., while the TCP Module analyzes the TCP header or the Layer 7 Module parses through portions of the packet data), the packet data is buffered in a central location. In the illustrated embodiment, as the packet data passes through each module, only the portion of the packet data to be analyzed by the particular module is retained within the particular module. For example, as the packet data passes through the TCP Module 202, only the TCP header is retained by the TCP Module. The packet data passes through each module without being retained and deposited in a central storage buffer.

A centralized buffer facilitates buffer management by simplifying the number of buffer devices that require monitoring and managing. Additionally, since the packet data is only stored in a single location, read and write cycle times are significantly reduced thereby improving overall performance time. That is, the packet data does not have to be written into and read from multiple buffer devices.

Buffering may be centralized in any suitable location or within any suitable logic module. Likewise, buffering may be managed by any suitable logic module. In the illustrated embodiment, buffering is centralized within the Layer 7 Module 204, and buffer management is accomplished by the TCP Module. In this implementation, control signals communicated between the TCP Module and the Layer 7 Module can be functionally divided into three categories: receive commands, transmit commands, and analyze commands. A receive command controls writing of data received into the TCP Module into the buffer within the Layer 7 Module. An analyze command controls data reading from the buffer so that the data may be analyzed by the Layer 7 Module. A transmit command controls reading of the data from the buffer so that the data can then be transmitted out of the switch to a selected destination (e.g., to a selected server). Thus, buffer management mechanism merely requires one write (for received data) and two read (for analyzing and transmitting data) buffer access cycles for any particular packet data received into the switch. Additionally, since the packet data is merely passed through the TCP Module and written into the Layer 7 Module's buffer, the only module that actually sees the data frames is the Layer 7 Module (e.g., for parsing and searching procedures).

As shown, the Layer 7 Module 204 includes Buffer Memory 212 for storing the packet data. The Buffer Memory 212 may be any suitable memory type for dynamically storing data, such as an SDRAM. The Layer 7 Module 204 also includes a Receive Function Block 210 for writing packet data into the Buffer Memory 212 and a Transmit Function Block 216 for reading packet data from the Buffer Memory. The Transmit Function Block 216 also transmits the read packet data out of Switch 110.

The TCP Module controls writing and reading functions of the respective Receive and Transmit Functions Blocks of the Layer 7 Module (e.g., by the receive command and the transmit commands, respectively). A receive command includes the packet data and a buffer address for writing such data. In the illustrated embodiment, the Layer 7 Module 204 receives a packet with a packet header that indicates the type of command (e.g., a receive command) and a buffer address for writing such packet. The receive command may also specify the data length. The Layer 7 Module 204 then processes that command header and deals with the associated packet as indicated by the command. For example, the Receive Block 210 of the Layer 7 Module 204 writes the packet into the indicated buffer address within its Buffer Memory 212.

The TCP Module may write any length or type of data to the buffer of the Layer 7 Module. In one embodiment, the TCP Module writes IP fragments to the buffer of the Layer 7 Module as the IP fragments are received into the TCP Module. The TCP Module orders and reassembles the fragments in any suitable manner. For example, the TCP Module indicates which order the fragments are to written into the buffer via the receive command's address. In this implementation, the TCP Module indicates that a first fragment is to be written into a first address, a second fragment is to be written into a second address that is located after the first fragment within the buffer, etc. The TCP Module tracks the order of the fragments, for example, by the fragment offset field in each fragment. This allows the TCP Module to leave room within the buffer for fragments that have not been received yet. In the above example, if a fourth fragment is received after the second fragment, the TCP Module may indicate that the fourth fragment is to written in a location that leaves room for the third fragment within the buffer. Alternatively, the fragments may be linked within the buffer via pointers.

The TCP Module also tracks the location of data portions written into the buffer that will later by analyzed by the Layer 7 Module. In other words, the TCP Module tracks data portion buffer address so as to specify which data portions are to be parsed and searched by the Layer 7 Module. This tracking may be implemented in any suitable manner. In one implementation, the TCP Module keeps pointers to addresses of packet data within the buffer. The addresses may then be indicated to the Layer 7 Module in an analyze command. The addresses of the packet data may also be used by the TCP Module to command the Layer 7 Module to transmit packet data from particular addresses within the buffer.

A transmit command includes a buffer address, a length value for the data to be transmitted, and encapsulation data. The encapsulation data field is optional and is merely to enhance flexibility for packet transmission. For example, encapsulation data may represent modified Layer 2 (MAC) headers, or may indicate queuing and transmission priority to the device receiving packets from the Layer 7 Module. The Transmit Block 216 then is able to read one or more packets from the indicated buffer address and length. The buffer address may be the start of the packet data or may also include the original header. The encapsulation data may replace the original header. The Transmit Block 216 then transmits such packets, original header (if indicated by the buffer address), and encapsulation data (if present) to a selected destination. The selected destination may be indicated within the encapsulation data. Alternatively, the packet data may be transmitted to a NAT (Network Address Translation) module prior to being transmitted to its selected destination. The NAT module may then alter the packet data header to specify the selected destination. In another embodiment, a selected destination may be included as one of the transmit command parameters.

The TCP Module may also be capable of asking the Layer 7 Module whether it has finished transmitting a particular set of packet data. In other words, the TCP Module can query the Layer 7 Module to determine whether the buffer memory corresponding to the packet data that is being transmitted is relinquished yet. In one implementation, the TCP Module sends a relinquish request to the Layer 7 Module. When the Layer 7 Module is finished transmitting, it will send a relinquish response back to the TCP Module that indicates relinquishment in response to the relinquish request. Of course, when the memory is relinquished for transmitted data, it may then be refilled again with newly received packet data. Alternatively, the Layer 7 Module may simply indicate that it is done transmitting (e.g., by sending a relinquished signal to the TCP Module) when it is done transmitting without first receiving a relinquish request. Likewise, the Layer 7 Module may send an "analyze done" signal to the TCP Module to indicate when it has completed an analyze (parse and search) command issued by the TCP Module. Alternatively, the TCP Module may specifically request the Layer 7 Module to send it a signal after analysis is complete.

An analyze command specifies packet data analysis procedures within the Layer 7 Module. The analyze commands from the TCP Module 202 may be in any suitable format for indicating how the Layer 7 Module 204 is to parse and search one or more fields of the packet data. In the illustrated embodiment, the analyze commands include the following parameters: buffer address, analysis_length, session_id, first_of_session, and session_type. The buffer address, of course, specifies the buffer address of the packet data to be analyzed, and the analysis_length specifies the number of bytes within the packet data to analyze. The session_id identifies the Layer 7 session to which the packet data belongs. In other words, the session_id is a mechanisms for differentiating between different sessions. The first_of_session indicates whether this packet data is the first packet data for a particular session (e.g., session_id). The session_type identifies the Layer 7 protocol that is to be parsed for this particular session. For example, the session_type may indicate whether the packet data is to be parsed as HTTP or SSL (Secure Socket Layer) data.

The TCP Module 202 may be configured to perform any number and type of packet data analysis and manipulation procedures. In the illustrated embodiment, as incoming packet data is passed through TCP analysis module 202, TCP/IP headers (from the packet data) are analyzed by a "TCP/IP header analyzer" block 208. That is, the header analyzer merely forwards the packet data frames without any subsequent analysis of packet data. The TCP/IP header block 208 checks for TCP errors in packet data received from one of the servers 112 or one of the clients 102. For example, the analyzer 208 checks the order of the packets via a TCP sequence number.

For packet data directed from a client 102 to a server 112, the header analyzer 208 controls transmission of the packet data to one of the servers 112 after receiving a destination decision from Load Balancing Module 206. This header analyzer block 208 associates a control header with the incoming packet data. This control header is based on analysis of the TCP/IP header. The control header contains, for example, transmit, receive, or analyze commands. That is, the control instructs the Layer 7 Module on how to handle the received packet data that is being passed through the TCP Module to the Layer 7 Module's buffer. The TCP module 202 may also be configured to implement any number of additional packet analysis procedures. For example the TCP module 202 may also look up the session ID, perform a NAT function on the TCP header, etc.

The search results are output to the Load Balancing Module 206. The Load Balancing Module 206 determines a destination for the packet data and outputs such "destination" decision to TCP header analyzer 208. The header analyzer 208 determines which packet data is to be transmitted and thereby indicates this information in the form of a transmit command to a Transmit Function Block 216 within the Layer 7 Module 204. The Transmit Function Blocks 216 then reads the appropriate packet data from the Buffer Memory 212 and transmits the packet data to the indicated destination (e.g., destination is indicated in the transmit command or within the packet data encapsulation data).

Like the TCP Module 202, the Layer 7 Module 204 may include any other suitable mechanisms (besides the receive and transmit function blocks) for analyzing and/or handling packet data. As shown, the Layer 7 Module 204 also includes an Analyze Function Block 214 arranged to receive "analyze commands" from the TCP/IP header analyzer 208 which specify how to handle the packet data read from a particular location within buffer memory 212. Of course, the packet data may be read from memory located externally from the Layer 7 Module 204.

The Analyze Function Block 214 also outputs search results based on one or more fields within the packet data and the received analyze commands. The search results may also be based on any number of received sets of packet data and/or associated analyze command(s). The search results may be in any suitable form and depends on the particular application requirements. By way of specific examples, the search results may specify a group of servers that meet the requirements for a particular session. Alternatively, the search results may specify the set of regular expressions configured by the user that a particular data field matches. In the illustrated embodiment, the load balancing module 206 uses one or more search results to form a policy for determining a destination server 112 for the packet data.

Any suitable techniques may be used for the Analyze Function Block 214 so as to facilitate parsing and searching. Several embodiments are further described in concurrently filed U.S. patent application, having application Ser. No. 09/714,793, which commonly assigned application is incorporated herein by reference in its entirety.

Figure 4:
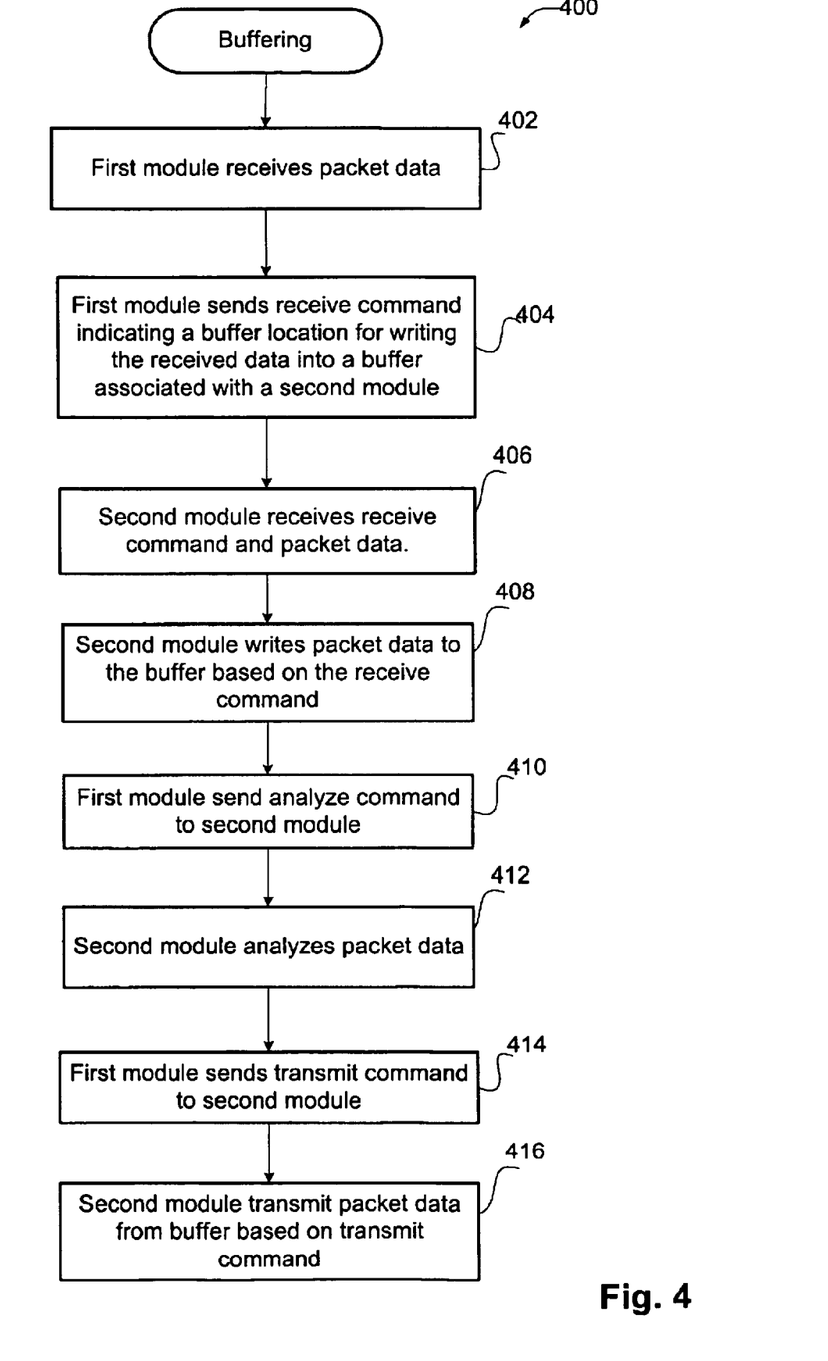
FIG. 4 is a flowchart illustrating a buffering procedure in accordance with one embodiment of the present invention.

FIG. 4 is a flowchart illustrating a buffering procedure 400 that may be utilized with the system of FIG. 2 in accordance with one embodiment of the present invention. Initially, a first module (e.g., the TCP Module) receives packet data in operation 402. The first module then sends a receive command indicating a buffer location for writing the received packet data associated with a second module (e.g., the Layer 7 Module) in operation 404. The second module then receives the receive command and associated packet data in operation 406 and writes the packet into the buffer based on the receive command in operation 408.

The first module may also send an analyze command to the second module specifying that a parse procedure should commence, for example, for the received packet data in operation 410. The second module, in response to the analyze command, analyzes the received packet data in operation 412. As described above for one embodiment, the first module sends the analyze command as a header of the associated packet data that is being passed to the second module.

The first module may also send a transmit command to the second module in operation 414. In response, the second module transmits the received packet data from the buffer based on the transmit command in operation 416. As described above, the transmit command specifies which packet data is to be transmitted out of the buffer. One or more operations of the buffering procedure of FIG. 4 may be performed for each set of packet data received into the first module and passed to the second module. Additionally, the operations may be performed in any suitable order. For example, three sets of packet data may be received and analyzed by the second module prior to transmitting a one of the three sets of packet data Referring back to FIG. 1, the switch 110 may include one or more caching mechanisms, in addition to or instead of the above described distribution mechanism. The switch 110 generally "spoofs" the destination site 112. The switch 110 responds to a request from a client 102 to obtain objects from destination site 112. The switch 110 either retrieves objects from destination site 112 to then present to one of the clients or retrieves objects from its own cache (which objects were previously retrieved from the destination site 112).

It will be understood that the caching mechanisms described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

Alternatively, any suitable proxy mechanism may be utilized for caching requested data. For example, a Unix based proxy mechanism may be utilized. For example, a proxy may be implemented as a daemon on a Unix machine (e.g., the switch 110). Software on a client platform (e.g., 102*a*) on the network protected by the firewall is specially configured to communicate with the resident daemon which then makes the connection to a destination platform (e.g., 112) at the client's request. The daemon passes information back and forth between the client and destination platform (e.g., 112) acting as an intermediary or "proxy." Not only does this model provide the desired protection for the client's network, it gives the entire network the IP address of the proxy server (e.g., 110), therefore simplifying the problem of addressing of packet data to an increasing number of users. Moreover, because of the storage capability of the proxy server, information retrieved from remote servers is stored rather than simply passed through to the requesting platform (e.g., 102*a*). That is, by storing frequently requested data, subsequent requests for the same data may be serviced without having to retrieve the requested data from its original remote source. Of course, the Unix based proxy is not transparent to the client. That is, the client has to be specifically configured to work with the proxy. Thus, the above described transparent caching mechanisms are preferred.

Generally, the buffering techniques of the present invention may be implemented on software and/or hardware. In the present invention, the buffer management and buffer accessing procedures are implemented within separate devices. For example, each procedure can be implemented in an operating system kernel, in a separate user process, in a library package bound into network applications, on a specifically constructed machine, or on a network interface card. In a specific embodiment of this invention, the techniques of the present invention are implemented in software such as an operating system or in an application running on an operating system.

Figure 3:
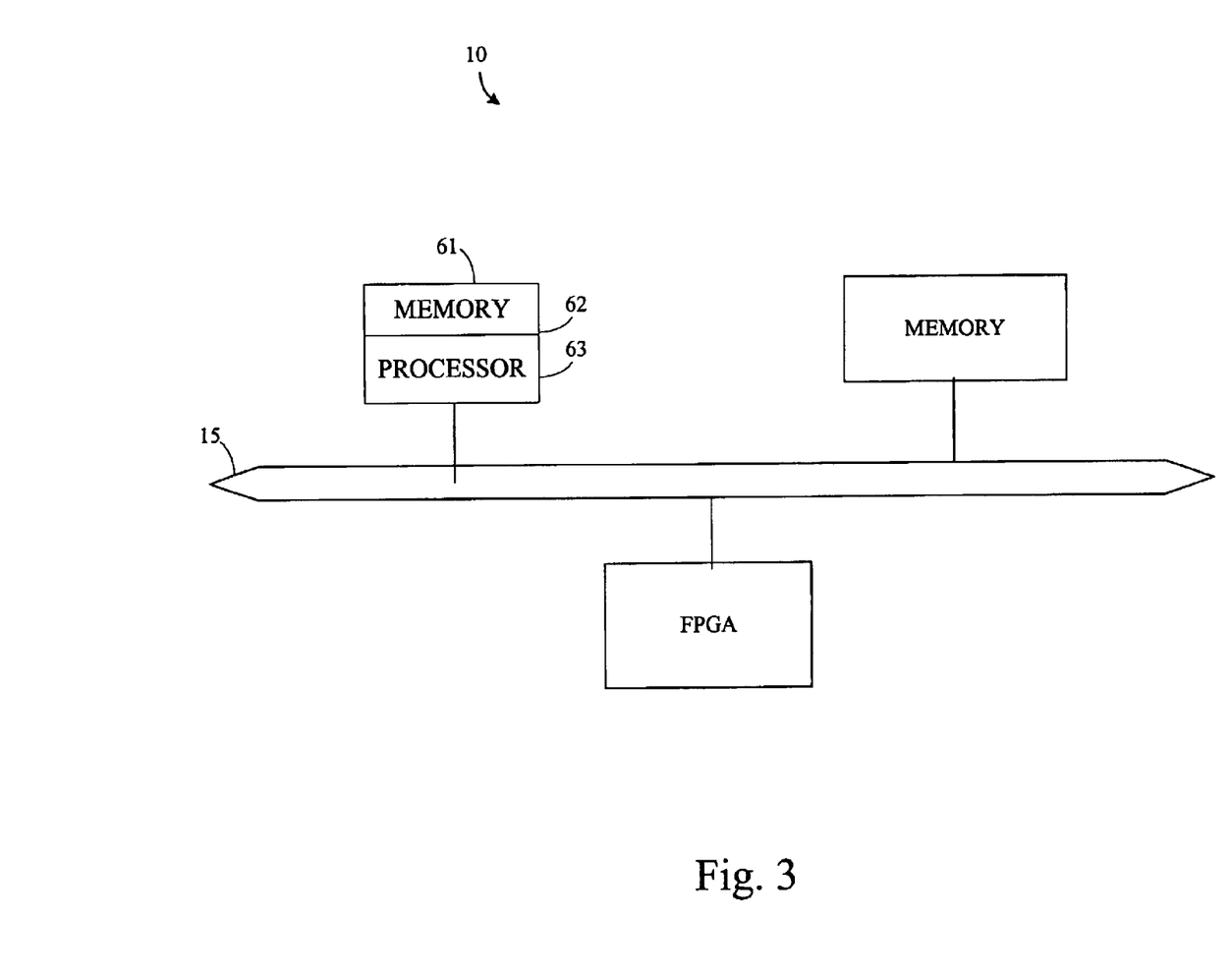
FIG. 3 is a diagrammatic representation of a device suitable for implementing each of the TCP Module and the Layer 7 Module in accordance with one embodiment of the present invention.

FIG. 3 is a diagrammatic representation of a device 10 suitable for implementing each of the TCP Module 202 and the Layer 7 Module 204 in accordance with one embodiment of the present invention. As shown, a device 10 suitable for implementing the TCP Module or Layer 7 Module includes a master central processing unit (CPU) 62, a bus 15 (e.g., a PCI bus), one or more memory devices, and one or more field programmable gate array (FPGA) devices. The FPGA typically has a reasonably high bandwidth bus for passing packet data through the module and sending particular data portions to the CPU for processing. For the TCP Module, the FPGA sends the TCP header to the CPU for analysis, while the packet data is passed to the Layer 7 Module for storage within the buffer.

When acting under the control of appropriate software or firmware, the CPU of the Layer 7 Module may be responsible for writing packet data to the buffer (based on instructions from the buffer manager), parsing through each character of packet data, initiating one or more search types, performing searches on relevant data characters, outputting search results, transmitting packet data (based on instructions from the buffer manager), etc. The CPU of the TCP Module may be responsible for analyzing the TCP header of the packet data, controlling read and write of the packet data into the buffer of the Layer 7 Module, sending receive, transmit, and analyze commands to the Layer 7 Module, etc. In one implementation, the CPU accomplishes these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors, the Intel family of processors, or the MIPS family of microprocessors. In an alternative embodiment, processor 63 is specially designed hardware for controlling the operations of device 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, catching and/or storing data, programming instructions, etc.

Regardless of network device's configuration, it may employ one or more memories or memory modules (such as, for example, memory block 65) configured to store data, program instructions for the general-purpose network operations and/or buffering described herein. The program instructions may control the operation of an operating system and/or one or more applications, for example. The memory or memories of the TCP Module may also be configured to store data structures for error control and ordering of the packet data (e.g., sequence numbers), managing the buffer of Layer 7 Module (e.g., pointers to buffer addresses), etc. The memory or memories of the Layer 7 Module may be used as a centralized buffer, for storing parse and search states, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. An apparatus for buffering packet data sent from a first node to a second node within a computer network, the apparatus comprising:
a first device having a buffer and at least a first processor; and
a second device having at least a second processor, wherein the first device is a physically separate device from the second device,
wherein the second processor of the second device is configured to manage the buffer of the first device and the first processor is also configured to analyze packet data accessed from the buffer,
wherein the second processor of the second device is further configured to analyze portions of the packet data accessed from the buffer of the first device,
wherein the second processor of the second device manages the buffer of the first device by causing data fragments of a datagram to be stored in the buffer in an order that was used to send such data fragments.

2. An apparatus as recited in claim 1, wherein the second processor of the second device manages the buffer of the first device by causing packet data to be stored in the buffer until the first processor is ready to analyze such packet data.

3. An apparatus as recited in claim 1 wherein the second processor of the second device manages the buffer of the first device by causing packet data to be read from the buffer when the first processor is ready to analyze such packet data.

4. An apparatus as recited in claim 1, wherein the second processor of the second device manages the buffer of the first device by causing packet data to be stored in the buffer until a decision has been reached as to such packet data's destination.

5. An apparatus as recited in claim 1, wherein the second processor of the second device manages the buffer of the first device by causing packet data to be read from the buffer when a decision has been reached as to such packet data's destination.

6. An apparatus as recited in claim 1, wherein the second processor of the second device manages the buffer of the first device by tracking a plurality of buffer addresses of packet data written into the buffer.

7. An apparatus for buffering packet data sent from a first node to a second node within a computer network, the apparatus comprising:
a first device having a buffer and at least a first processor; and
a second device having at least a second processor, wherein the first device is a physically separate device from the second device,
wherein the second processor of the second device is configured to manage the buffer of the first device and the first processor is also configured to analyze packet data accessed from the buffer,
wherein the second processor of the second device is further configured to analyze portions of the packet data accessed from the buffer of the first device,
wherein the second processor of the second device manages the buffer of the first device by causing data frames of packet data to be stored in the buffer in an order that was used to send such data frames.

8. An apparatus for buffering packet data sent from a first node to a second node within a computer network, the apparatus comprising:
a first device having a buffer and at least a first processor; and
a second device having at least a second processor, wherein the first device is a physically separate device from the second device,
wherein the second processor of the second device is configured to manage the buffer of the first device and the first processor is also configured to analyze packet data accessed from the buffer,
wherein the second processor of the second device is further configured to analyze portions of the packet data accessed from the buffer of the first device, wherein the second processor of the second device manages the buffer of the first device by tracking a plurality of buffer addresses of packet data written into the buffer, wherein the second processor of the second device manages the buffer of the first device by instructing the first processor of the first device to read and analyze packet data from a particular buffer address of the buffer.

9. An apparatus as recited in claim 8, wherein the first processor is configured to analyze frames of packet data stored within the buffer, but the second processor is not configured to analyze frames of packet data stored within the buffer.

10. An apparatus for analyzing packet data sent from a first node to a second node within a computer network, the apparatus comprising:

a buffer module associated with a buffer, wherein buffer module includes a receive module for receiving packet data and writing it to the buffer and a transmit module for transmitting packet data from the buffer; and a manager module for receiving packet data, the manager being configured to send commands to the buffer module indicating that received packet data is to be stored within the buffer at locations specified by the manager module and specifying data portions that are to be transmitted from the buffer to a selected destination.

11. An apparatus as recited in claim 10, wherein the buffer module further includes an analyze module for analyzing packet data read from the buffer and wherein one or more of the commands sent by the manager to the buffer module specify which packet data from the buffer is to be read from the buffer and analyzed by the analyze module.

12. An apparatus as recited in claim 11, wherein the manager module is further to analyze headers of received packet data to thereby reduce errors in received packet data and order received packet data before or while it is stored within the buffer.

13. An apparatus as recited in claim 12, wherein the commands sent by the manager to the buffer module include at least a receive command for instructing the receive module of the buffer module to write specific packet data to the buffer, at least a transmit command for instructing the transmit module of the buffer module to transmit specific packet data, and at least an analyze command for instructing the analyze module of the buffer module to analyze specific packet data.

14. An apparatus as recited in claim 13, wherein the receive command includes packet data and a buffer address.

15. An apparatus as recited in claim 14, wherein the receive command also includes a packet data length.

16. An apparatus as recited in claim 13, wherein the transmit command includes a buffer address.

17. An apparatus as recited in claim 16, wherein the transmit command includes a packet data length and encapsulation data.

18. An apparatus as recited in claim 13, wherein the analyze command includes a buffer address specifying a start of the data portion to be analyzed by the analyze module of the buffer module and a session type specifying a protocol associated with the data portion to be analyzed by the analyze module.

19. An apparatus as recited in claim 18, wherein the analyze command also includes a data portion length specifying a length of the data portion to be analyzed by the analyze module, a session identifier, and a first_of_session identifier that indicates whether the packet data at the buffer address is data from a beginning of a session.

20. An apparatus as recited in claim 19, wherein the analyze module of the buffer module is further configured to analyze the specified data portion based on at least the session type, session identifier and the first_of_session identifier.

21. An apparatus as recited in claim 20, wherein the analyze module of the buffer module is further configured to indicate to the manager module when analysis of the specified data portion is complete.

22. An apparatus as recited in claim 21, wherein the analyze module of the buffer module is further configured to indicate to the manager module when analysis of the specified data portion is complete, such indication being in response to a query from the manager module.

23. An apparatus as recited in claim 18, wherein the analyze module of the buffer module is further configured to analyze the specified data portion based on at least the session type.

24. An apparatus as recited in claim 13, wherein the apparatus is in the form of a Layer 7 load balance switch, wherein the analyze module is configured to parse through the packet data and perform a search on such parsed data and output search results from such search, the apparatus further comprising a load balancing module arranged to receive the search results from the analyze module and determine a destination for the packet data based on the search results and communicate such determined destination to the manager module, wherein the manager module is further configured to instruct the transmit module to transmit the packet data to the determined destination.

25. A system for analyzing packet data sent from a first node to a second node within a computer network, comprising:

an apparatus as recited in claim 24; and a plurality of load balancing servers coupled to the apparatus and each configured to receive.

26. An apparatus as recited in claim 13, wherein the analyze module is further configured to perform web caching.

27. An apparatus as recited in claim 10, wherein the transmit module of the buffer module is further configured to indicate to the manager module when transmission of a specified data portion is complete.

28. An apparatus as recited in claim 27, wherein the analyze module of the buffer module is further configured to indicate to the manager module when analysis of the specified data portion is complete, such indication being in response to a query from the manager module.

29. An apparatus analyzing packet data sent from a first node to a second node within a computer network, the apparatus comprising:

first means for receiving packet data and sending at least a receive command indicating a buffer location for writing the received packet data within a buffer;

second means for receiving the receive command and received packet data and writing the packet data to the buffer based at least on the receive command;

wherein the first means is also configured for sending at least a transmit command indicating that a specified data portion is to be transmitted from the buffer; and wherein the second means is also configured for receiving the transmit command and in response to such transmit command, transmitting the specified data portion from the buffer.

30. A method of analyzing packet data sent from a first node to a second node within a computer network, the method comprising:

in a first module, receiving packet data and sending at least a receive command indicating a buffer location for writing the received packet data within a buffer associated with a second module;

in the second module, receiving the receive command and received packet data and writing the packet data to the buffer based at least on the receive command;

in the first module, sending at least a transmit command indicating that a specified data portion is to be transmitted from the buffer; and in the second module, receiving the transmit command and in response to such transmit command, transmitting the specified data portion from the buffer.

31. A computer program product for analyzing packet data sent from a first node to a second node within a computer network, the computer program product comprising:

at least one computer readable medium;

computer program instructions stored within the at least one computer readable product configured to cause a processing device to:

receive packet data in a first module and send at least a receive command indicating a buffer location for writing the received packet data within a buffer associated with a second module;

receive the receive command and received packet data in the second module, and write the packet data to the buffer based at least on the receive command;

send at least a transmit command from the first module indicating that a specified data portion is to be transmitted from the buffer; and receive the transmit command in the first module and in response to such transmit command, transmit the specified data portion from the buffer.

* * * * *